(12) United States Patent
Wessels et al.

(10) Patent No.: US 7,224,878 B1
(45) Date of Patent: May 29, 2007

(54) BATIO$_3$ THIN FILM WAVEGUIDES AND RELATED MODULATOR DEVICES

(75) Inventors: Bruce W. Wessels, Evanston, IL (US); Pingsheng Tang, Medford, OR (US); David J. Towner, Portland, OR (US); Anthony L. Meier, Chicago, IL (US)

(73) Assignee: Northwestern University, Evanston, IL (US)

( * ) Notice: Subject to any disclaimer, the term of this patent is extended or adjusted under 35 U.S.C. 154(b) by 24 days.

(21) Appl. No.: 11/273,152

(22) Filed: Nov. 14, 2005

Related U.S. Application Data

(60) Provisional application No. 60/627,252, filed on Nov. 12, 2004.

(51) Int. Cl.
*G02B 6/10* (2006.01)
*G02F 1/035* (2006.01)
*G02F 1/295* (2006.01)

(52) U.S. Cl. .......................... 385/130; 385/129; 385/8; 385/2

(58) Field of Classification Search ........ 385/129–132, 385/1–5, 8, 14
See application file for complete search history.

(56) References Cited

U.S. PATENT DOCUMENTS

| 6,118,571 A * | 9/2000 | Wessels et al. ............. 359/245 |
| 7,020,374 B2 * | 3/2006 | Talin et al. .................. 385/131 |
| 2006/0222281 A1 * | 10/2006 | Deliwala ...................... 385/8 |

* cited by examiner

*Primary Examiner*—Kevin S. Wood
(74) *Attorney, Agent, or Firm*—Reihart, Boerner, Van Deuren s.c.

(57) ABSTRACT

Electro-optic modulator devices and related waveguide components comprising BaTiO$_3$ films.

20 Claims, 7 Drawing Sheets

Fig. 2A
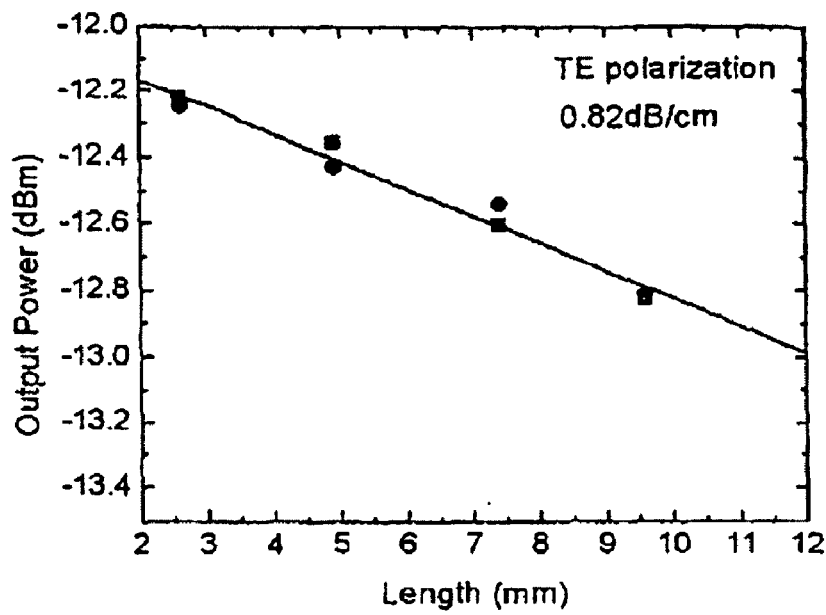
(a)
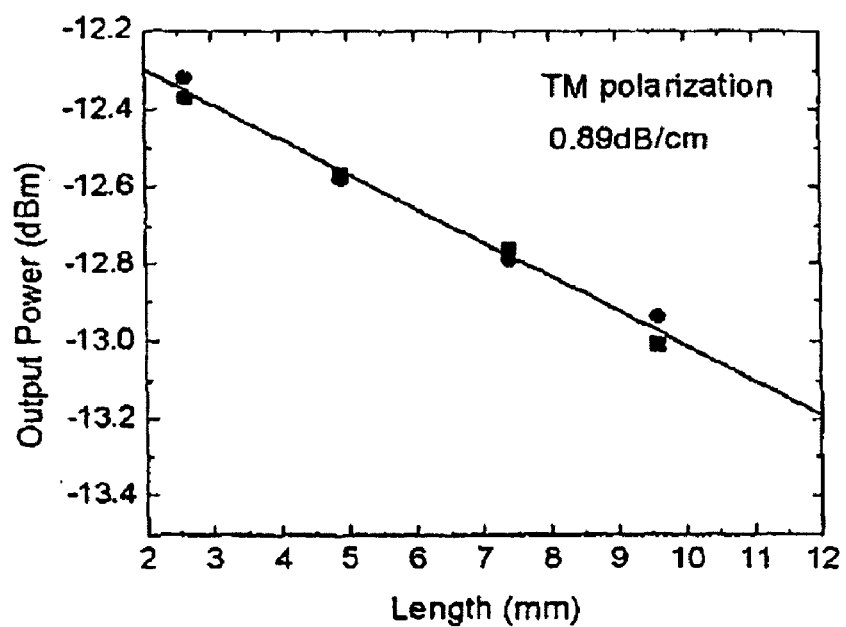
(b)
Fig. 2B

# BATIO₃ THIN FILM WAVEGUIDES AND RELATED MODULATOR DEVICES

This application claims priority benefit from provisional application Ser. No. 60/627,252, filed Nov. 12, 2004, the entirety of which is incorporated herein by reference.

The United States government has certain rights to this invention pursuant to Grant nos. F33615-02-C-5053/P00001, P00002 and P00003 from the Department of Defense, and Grant nos. ECS-0123469 and DMR-0076977 from the National Science Foundation, all to Northwestern University.

BACKGROUND OF THE INVENTION

Electro-optic modulators are used for high-speed optical communication systems and ultrafast information processing applications. Bulk modulators of discrete electro-optic materials are possible, but typically with high driving voltage and narrow modulation bandwidth. To lower driving voltage and increase modulation bandwidth, materials with large electro-optic coefficients, low dielectric constants and single mode waveguide formation are required.

The ferroelectric oxide, $LiNbO_3$, has been widely utilized in low loss, low drive voltage high-speed modulators because of its large electro-optic coefficients and excellent optical transparency. Low loss optical waveguides can be produced by locally modifying the composition or stoichiometry in the $LiNbO_3$ substrate through diffusion or ion-exchange processes. Other ferroelectric materials with much higher electro-optic coefficients could lead to improved electro-optic modulators with lower drive voltages and smaller dimensions. Of particular interest is the ferroelectric $BaTiO_3$, which has electro-optic coefficients as high as 1300 pm/V in the bulk (two orders higher than that of $LiNbO_3$). Bulk $BaTiO_3$, however, has a very large dielectric constant that limits its application for high modulation bandwidth. Further restricting such use, the metal-diffusion and ion-exchange fabrication methods adapted for $LiNbO_3$ have not been successful with bulk $BaTiO_3$ material. As a result, thin film ferroelectric $BaTiO_3$ waveguide modulators have been developed.

A thin film composite structure of $BaTiO_3/MgO$ has been shown to lower the effective microwave index enabling velocity match between the microwave and optical waves needed for high-speed traveling wave operation. Furthermore, $BaTiO_3$ thin films can be integrated with silicon using a thin film buffer layer of MgO. However, fabrication of low-loss optical waveguides with $BaTiO_3$ thin films on a low index substrate has proven a difficult task due to optical scattering losses. The same high refractive index contrast that enables waveguides with tight bends and small dimensions also increases sensitivity to surface scattering. Conventional methods for thin film ridge waveguide formation, such as directly wet-etching or dry-etching into the $BaTiO_3$ thin film, increase the surface and sidewall roughness of the $BaTiO_3$ waveguide. Optical waveguides fabricated by these methods exhibit a propagation loss of 3-4 dB/cm and a high polarization dependent loss on the order of 5 dB/cm. Polarization-dependent loss increases the complexity of a fiber communication system. Accordingly, the development of polarization insensitive operational waveguides is an extremely important component in the advancement of such systems.

SUMMARY OF THE INVENTION

In light of the foregoing, it is an object of the present invention to provide electro-optic waveguides, related modulator device configurations and/or method(s) for their use, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It is another object of this invention to provide a waveguide configuration that exhibits low optical waveguide propagation losses and low polarization-independent losses.

It is another object of this invention to provide a waveguide configuration that exhibits single mode waveguide operation.

It is another object of this invention to fabricate ferroelectric thin film waveguide through standard $Si/SiO_2/Si_3N_4$ fabrication technologies which may be employed in a manner compatible with standard CMOS processing technologies.

It is an object of this invention to provide a waveguide configuration obtainable using available fabrication techniques without compromising $BaTiO_3$ thin film properties.

It is a further object of this invention to provide low loss ferroelectric thin film waveguide electro-optic modulators that exhibits low driving voltage, low power consumption and compact size for photons integrated circuits.

It is another object of this invention, alone or in conjunction with one or more of the preceding objectives, to provide a $BaTiO_3$ thin film composite structure that lowers composite $BaTiO_3/MgO$ dielectric constant for wide bandwidth operation.

It is an object of this invention to provide a novel strip-loaded waveguide configuration that comprises a low refractive index $Si_3N_4$ (or other low index materials, such as $SiO_2$) as a strip layer on $BaTiO_3$ thin film and MgO substrate to form ferroelectric thin film channel waveguide.

Other objects, features, benefits and advantages of the present invention will be apparent from this summary and the following descriptions of certain embodiments, and will be readily apparent to those skilled in the art having knowledge of various waveguide modulator devices, configurations and related fabrication techniques. Such objects, features, benefits and advantages will be apparent from the above as taken into conjunction with the accompanying examples, data, figures and all reasonable inferences to be drawn therefrom.

In part, the present invention can relate to a novel strip-loaded thin-film electro-optic waveguide modulator device configuration. Such a device can comprises a waveguide comprising a substrate, a nano-dimensioned film component comprising $BaTiO_3$ on or coupled to the substrate, and a ridge component on or coupled to the film component. As described more fully below, the ridge component can have a refractive index less than the refractive index of the film component. In certain embodiments, the ridge component can comprise $Si_3N_4$, or other suitable materials known to those skilled in the art. The waveguide can be dimensioned to reduce polarization-dependent loss. To that effect, the ridge component can have a thickness dimension ranging from about 100 nm to about 200 nm, and the film component can have a thickness dimension ranging from about 300 nm to about 700 nm. Regardless of dimension, such a waveguide can comprise two opposed, substantially coplanar electrodes, each electrode on an opposed side of the ridge component, such that the waveguide can be used in a range of applications, including but not limited to incorporation into a fiber-optic internet network.

In certain other embodiments, such a waveguide can comprise a buffer component over the ridge component and between the film component and the electrodes. The buffer component can comprise $SiO_2$ and/or other materials known to those skilled in the art. To benefit operation and further device performance, such a buffer component can have a thickness dimension greater than about 400 nm. Regardless, in conjunction with other component dimensions, the buffer component dimension can be selected to substantially match optic wave and microwave phase velocities through the waveguide. As understood herein, and described more fully below, a substantial match of optic wave and microwave phase velocities can be defined as a difference thereof less than about 2% under the device parameter and operation conditions described below, or parameters and/conditions comparable thereto.

In part, this invention can also be directed to a method of using a silicon dioxide buffer component to reduce the effective microwave refractive index of a barium titanate thin film composite waveguide modulator device. Such a method can comprise providing a modulator device comprising a nano-dimensioned film component comprising $BaTiO_3$ and ridge component on the film component; and providing an $SiO_2$ buffer component over the ridge and film components, such that the waveguide provides an effective microwave refractive index at a given wavelength lower than a refractive index obtainable with such a device absent the buffer component. Such a waveguide can be dimensioned to reduce polarization-dependent loss. To that effect, the ridge component can have a thickness dimension ranging from about 100 nm to about 200 nm, the film component can have a thickness dimension ranging from about 300 nm to about 700 nm, and the buffer component can have a thickness dimension greater than about 400 nm.

In part, this invention can also be directed to a method of using a buffer component dimension to decrease microwave phase velocity in a waveguide modulator. Such a method can comprise providing a strip-loaded thin film electro-optic modulator device comprising a waveguide comprising a nano-dimensioned film component comprising $BaTiO_3$, and a ridge component on the film component; and providing an $SiO_2$ buffer component on the ridge and film components, the buffer component thickness dimension selected to provide a microwave phase velocity at a given wavelength higher than the microwave phase velocity obtainable with such a device without the buffer component. The buffer component thickness dimension can be selected to provide a microwave phase velocity substantially matching the optic wave phase velocity, at a particular wavelength. In conjunction therewith, other waveguide components can be dimensioned to reduce polarization-dependent loss. To that effect, the ridge component can have a thickness dimension ranging from about 100 nm to about 200 nm, and a film component thickness dimension ranging from about 300 nm to about 700 nm. Regardless, the buffer component can have a thickness dimension greater than about 400 nm. Depending upon operative wavelength, the buffer component can have a thickness dimension of about 1050 nm, and the film component can have a thickness dimension of about 600 nm.

Without limitation, referring to certain embodiments, the present waveguides can provide propagation losses of less than 0.9 dB/cm and a polarization dependent loss of less than 0.1 dB/cm—neither of which has been observed for ferroelectric thin film waveguides. Standard reactive ion etching techniques can be utilized to obtain such electro-optic modulators without deteriorating the $BaTiO_3$ surface and its properties. Thin film $BaTiO_3$ waveguide modulators, in accordance with this invention, show low waveguide losses, low polarization independent losses, low driving voltages and low half-wave voltage length product in the 1550 nm wavelength fiber communication window. Use of strip-loaded waveguide structures, consistent with the broader aspects of this invention, can enable fabrication of a wide variety of electro-optic devices using standard $Si/SiO_2/Si_3N_4$ technologies.

BRIEF DESCRIPTION OF THE DRAWINGS

FIGS. 2A–B. Output power of waveguides as a function of the waveguide length. (A) TE polarization. (B) TM polarization.

DETAILED DESCRIPTIONS OF CERTAIN EMBODIMENTS

Figure 1:
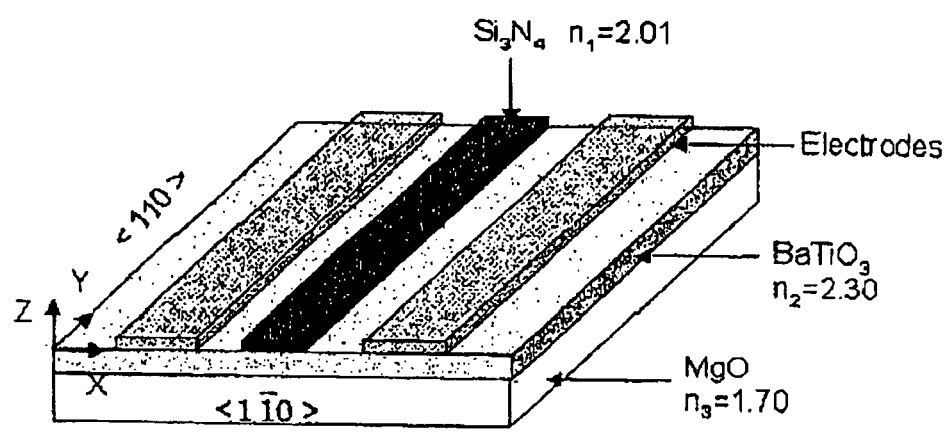
FIG. 1. A schematic diagram of strip-loaded electro-optic waveguide modulator structure. Waveguide propagation is along y-axis or <110> direction. Cleaved waveguide facet is on x-z plane.

As can relate to certain embodiments of this invention, a schematic illustration of a $BaTiO_3$ thin film electro-optic channel waveguide modulator is shown in FIG. 1. The electro-optic modulator was fabricated from an epitaxial $BaTiO_3$ thin film grown on a (100) oriented MgO substrate by a low-pressure two-stage metalorganic chemical vapor deposition (MOCVD) process. The metal-organic precursors used were titanium tetraisopropoxide and a fluorinated barium precursor ($Ba(hfa)_2PEB$). Standard MOCVD bubblers were used for precursor transport with high-purity argon used as a carrier gas. Ultra high-purity oxygen was used as the oxidant. Reactor pressures used during growth were between 1–10 Torr. Growth temperatures ranged from 650° C.–950° C. See, e.g., example 1, below.

By design, the $BaTiO_3$ film has a much higher refractive index than either the $Si_3N_4$ ridge component or the MgO substrate. The refractive indices are about 2.30, about 2.01 and about 1.70 at 1550 nm respectively. Dimensions can be adjusted to reduce polarization dependant loss and to keep the waveguide single mode. In the embodiment shown in FIG. 1, the $Si_3N_4$ ridge/strip is about 4 μm wide and about 125 nm thick, and the $BaTiO_3$ thin film is about 560 nm thick, the latter determined using a Metricon 2010 prism coupler. See, e.g., example 2, below. The $Si_3N_4$ layer was deposited on the $BaTiO_3$ thin film using a plasma enhanced chemical vapor deposition (PECVD) process employing standard $SiH_4NH_3$ chemistry, as would be understood by those skilled in the art. The waveguide region was defined using contact photolithography. The waveguide direction was aligned to the <110> crystallographic direction of the MgO substrate. The waveguide pattern was transferred by reactive ion etching the $Si_3N_4$ layer using a $CF_4$-based chemistry. After etching, the $BaTiO_3$ film was annealed at a temperature of 350° C. for 30 minutes in an $O_2$-rich atmosphere. To obtain the co-planar electrodes, metal layers of 15 nm Cr and 500 nm Au were deposited by e-beam evaporation and defined using a lift-off process. The electrodes gap is 8 μm. The sample was cleaved to provide a clean edge for optical coupling.

Waveguide propagation loss measurements for silicon nitride loaded thin film waveguides were carried out at a wavelength of 1542 nm for both the TE and TM polarizations. The measurement setup included a linearly polarized light source at the input side of the test waveguides and an optical power meter or near-field optical mode profile measurement system at its output. A Fabry-Perot (FP) laser diode driven by a current source supplied 2.0 mW of optical power after being collimated by a lens in free space. The polarized light was coupled into a polarization maintaining (PM) lensed-fiber (Nanonics Imaging Ltd.) through a 10× microscope objective. The polarized light emerging from the lensed-fiber was focused on the cleaved endface of the waveguide to achieve coupling. By angular adjustment of the PM fiber through a precision rotation stage, either TM or TE polarized light is obtained from the output of the PM lensed-fiber, which has a 2-μm beam spot at a working distance of 4 μm. A 25 dB extinction ratio of polarized light can be achieved with this setup. The output light from the waveguide was collected using a 60× objective lens focused onto an optical power meter with an InGaAs detector. By replacing the optical power meter with an infrared-camera connected to a computer with a video capture card, the near-field optical mode profile was observed.

Propagation loss of the thin film $BaTiO_3$ waveguides was measured by a standard cutback technique. The waveguide coupling endface remained unaltered for the whole measurement process. FIGS. 2A and 2B show the output power of the aforementioned waveguide configuration as a function of waveguide length for both TE and TM polarization, respectively. Two identical waveguides were tested for improved accuracy. The output power in decibel units exhibits a linear dependence on the waveguide length. Fitting the measured data, propagation and coupling losses were calculated. A fixed Fresnel reflection loss is assumed for all the waveguides. The propagation losses for TE and TM polarizations were 0.82 dB/cm and 0.89 dB/cm, respectively. A polarization dependent loss as low as 0.07 dB/cm can be obtained. A near field mode profile image of the output waveguide edge was captured by an infrared camera with a 60× microscope objective: Only a single mode was observed for both TE and TM polarizations.

Modulation characteristics were measured at a frequency of 2 kHz. The channel waveguide phase modulator was converted into an intensity modulator using a pair of polarizers at the waveguide's input and output. The linearly polarized input light was oriented at 45° with respect to the MgO <001> direction and the output polarizer was rotated 90° relative to the input polarization. The waveguide output was collected by a 40× microscope objective and focused on a photoreceiver (New Focus, Model: 2033).

Figure 3:
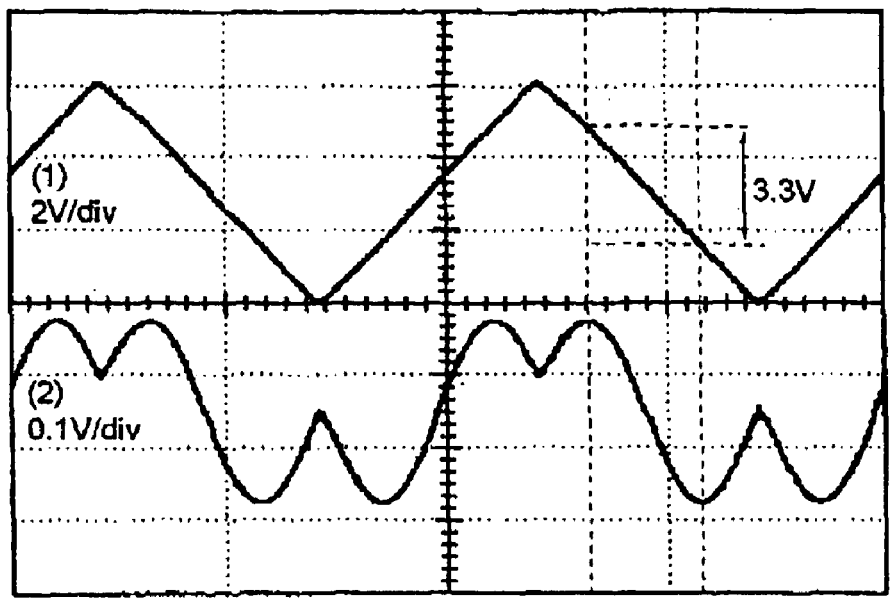
FIG. 3. Electro-optic modulator response at a wavelength of 1542 nm. Applied 2 kHz triangle-driving voltages on 3.2 mm long electrodes (top trace, 2 V/div) and modulation output signal (bottom trace, 0.1 V/div). $V\pi$ and $V\pi L$ equal 3.3 V and 1.1 V-cm, respectively.

Two figures of merit for an electro-optic modulator, half-wave voltage, $V_\pi$, and half-wave voltage-interaction length product, $V_\pi L$, were measured. $V_\pi$ of the modulator was determined by applying a 2 kHz triangular drive signal with DC bias on the modulation electrodes. The applied waveform and the output signal from the photoreceiver are shown in FIG. 3. The half-wave voltage, $V_\pi$, for an electro-optic modulator with 3.2 mm long electrodes was 3.3 V with 10 V DC bias at a wavelength of 1542 nm, corresponding to a half-wave voltage-interaction length product of 1.1 V cm.

The effective electro-optic coefficient, $r_{eff}$, was calculated from the measured half-wave voltage-interaction length product $V_\pi L$ value, using the expression, $$r_{eff} = \frac{\lambda \cdot g}{n^3 \cdot V_\pi \cdot L \cdot \Gamma} \quad (1)$$

where λ is the operating wavelength, g is the gap between the electrodes, L is the electrode length, n is the effective refractive index, and Γ is the overlap factor between the optical and applied electric fields. For the structure and dimensions of the electro-optic modulator tested, the overlap factor Γ is calculated as 0.59 from the optical and electrical field distribution based on effective index and conformal-mapping methods. The calculated effective electro-optic coefficient using eq. (1) is 162 pm/V at a bias of 10 V. The low half-wave voltage-interaction length product will enable modulator short to obtain high-speed operation. The low loss, channel waveguide electro-optic modulator device of this invention can be further extended to a Mach-Zehnder configuration, which can further decrease drive voltage, shorten electrodes length and widen bandwidth.

Figure 4:
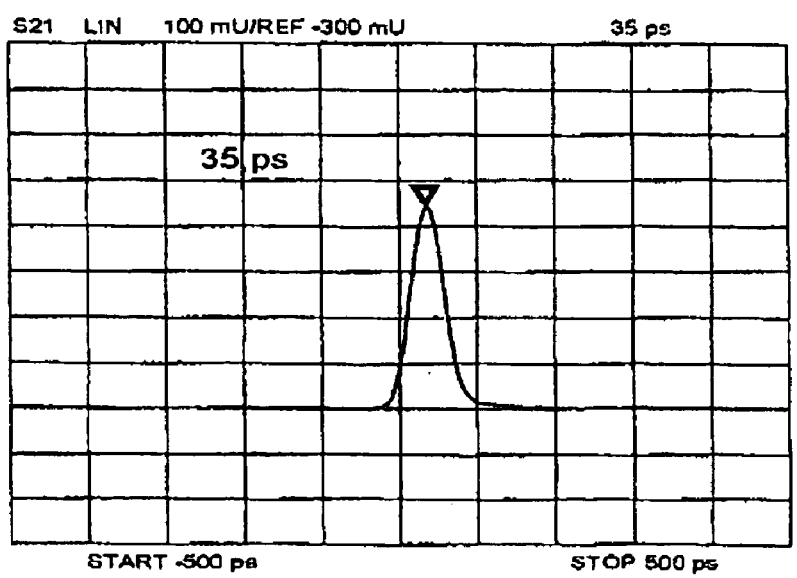
FIG. 4. Microwave index measurement on composite $BaTiO_3/MgO$ thin film by vector network analyzer in time domain. Microwave pulse is delayed by 35 ps on a 3.2 mm long electrode.

The microwave refractive index is another parameter indicative of wide modulation bandwidth operation. The microwave refractive index of the $BaTiO_3$ thin film modulator of FIG. 1 was directly measured from a time delay technique by vector network analyzer (VNA). A microwave pulse with less than 10 ps width was coupled into one side of the electrode from a transmitter port of the VNA, and the transmitted pulse was collected from the opposite end of the electrode by a receiver port of the VNA. FIG. 4 shows a 35 ps delay for 3.2 mm long electrode sample. The microwave velocity is about $0.91 \times 10^8$ m/s, and the composite microwave index and dielectric constant are 3.3, 20.8, respectively. The experimental results indicated the $BaTiO_3$ thin film composite structure has a much lower microwave index than that of bulk $BaTiO_3$, and its value is even lower than that of $LiNbO_3$.—demonstrating that strip-loaded $BaTiO_3$ thin film waveguide modulators are suitable for high frequency, wide bandwidth operation.

Figure 5:
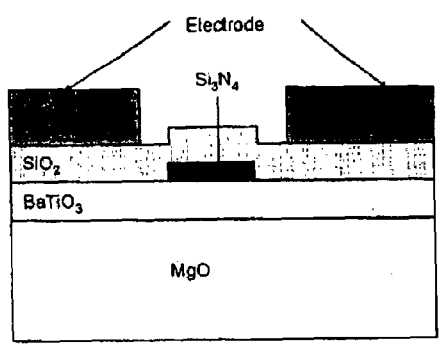
FIG. 5. A schematic of the $BaTiO_3$ waveguide modulator.

A schematic illustration of another electro-optic waveguide modulator device is shown in FIG. 5. The electro-optic modulator was fabricated from an epitaxial BaTiO$_3$ thin film grown on a (100) oriented MgO substrate by a metalorganic chemical vapor deposition (MOCVD) process. The modulator structure of this embodiment is also designed to support a single optical mode. The selected dimensions are 2 μm wide and 120 nm thick for Si$_3$N$_4$ strip-loaded layer. The BaTiO$_3$ thin film was 620 nm thick. The 2 gm wide waveguide was defined using photolithography with the propagation direction aligned to the <110> crystallographic direction of the MgO substrate. The Si$_3$N$_4$ layer was deposited on the BaTiO$_3$ thin film by plasma enhanced chemical vapor deposition. Waveguides were formed by reactive ion etching, and a 400 nm SiO$_2$ buffer layer was subsequently deposited either by electron beam evaporation from an SiO$_2$ charge or PECVD onto the waveguide to lower microwave refractive index for high frequency operation and to minimize optical mode absorption losses due to the metal electrodes. A lithographic liftoff process with subsequent deposition of 15 nm Cr and 500 nm Au by e-beam evaporation was used to obtain the electrodes. The electrode gap is 5 μm and length of the modulator is 5 mm.

Figure 6:
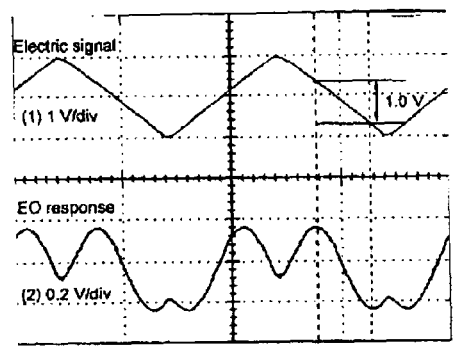
FIG. 6. Electro-optic modulator response at 1561 nm.

Modulation characteristics were measured at a wavelength of 1561 nm. The phase waveguide modulator was converted into an intensity modulator by a pair of polarizers at the waveguide's input and output sides. The half-wave voltage $V_\pi$ was measured at a 1 kHz modulation frequency. FIG. 6 shows the EO response of the modulator (bottom trace) observed while applying a triangular voltage waveform (top trace). $V_\pi$ for an EO modulator of 5 mm length is 1.0 V with 10V DC bias. The $V_\pi L$ product is, therefore, 0.5 V cm. An effective electro-optic coefficient of 360 pm/V is calculated from the measured $V_\pi$ for an overlap factor of 0.58 and SiO$_2$ buffer layer reduction factor of 0.61.

Figure 7:
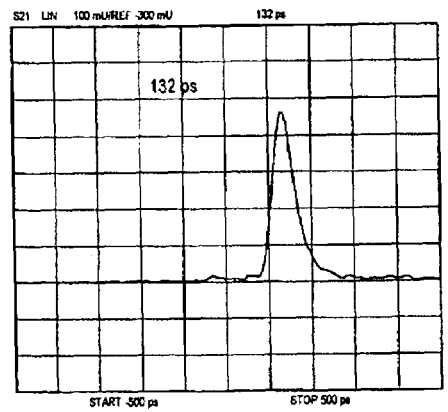
FIG. 7. Measured 132 ps time delay for 14 mm long electrode on $BaTiO_3$ thin film.

High frequency operation requires phase velocity matching. To determine the microwave velocity, the microwave refractive index of the modulator was directly measured using a time delay technique by vector network analyzer (VNA). Transmission response in time-domain was converted from frequency domain information over the frequency range between 50 MHz and 40.05 GHz using an inverse Fourier transform in near real-time. A microwave pulse was coupled into one side of the electrode from a transmitter port of the VNA, and the transmitted pulse was collected from the opposite end of the electrode by a receiver port of the VNA. FIG. 7 shows a 132 ps delay for a 14 mm long electrode sample with 400 nm buffer layer SiO$_2$. The microwave velocity was determined to be $1.06 \times 10^8$ m/s, and the composite microwave index is 2.8. Another sample without a SiO$_2$ buffer layer was also tested with a composite microwave index of 3.3. The experimental results indicate the BaTiO$_3$ thin film composite structure has a much lower microwave index than that of bulk BaTiO$_3$, and a SiO$_2$ buffer layer can effectively decrease the microwave index of the modulator. Thus BaTiO$_3$ thin films are potentially suitable for high frequency operation.

Figure 8:
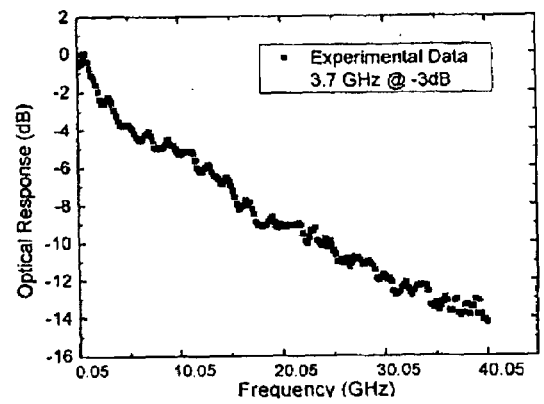
FIG. 8. Optical response of the $BaTiO_3$ electro-optic waveguide modulator

The preliminary high frequency response of a modulator without an SiO$_2$ buffer layer was tested up to 40 GHz, as shown in FIG. 8. The −3 dB bandwidth of the modulator was 3.7 GHz, which was primarily limited by velocity mismatch, impedance mismatch and the high microwave loss of the electrodes. Improvement of the high frequency response is possible through optimized design, thick SiO$_2$ buffer layer and thick electrodes to achieve velocity and impedance match, and to lower electrode losses. Thus, low drive voltage, compact electro-optic waveguide modulators with a 40 GHz bandwidth should be possible using the high EO coefficient of BaTiO$_3$ thin films.

Figure 9:
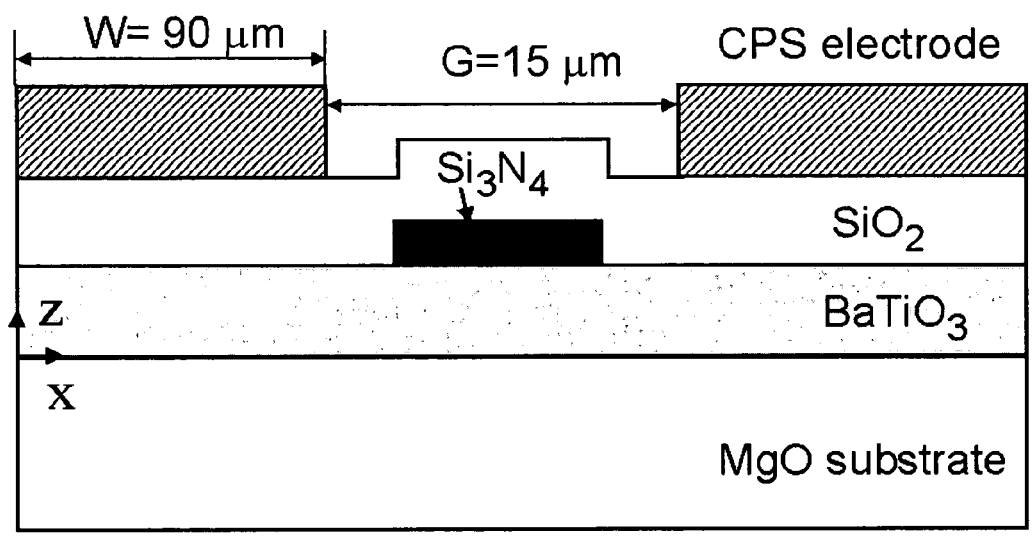
FIG. 9. Schematic cross-section of $BaTiO_3$ thin film waveguide modulator with a coplanar strip (CPS) electrode, in accordance with this invention.

To demonstrate other embodiments and aspects of this invention, the cross-section of a strip-loaded BaTiO$_3$ thin film waveguide modulator with a coplanar strip electrode configuration is shown in FIG. 9. The Si$_3$N$_4$ strip-loaded waveguide designed for 1550 nm wavelength was formed in a ~600 nm thick BaTiO$_3$ thin film on a MgO substrate as previously described. The BaTiO$_3$ thin film was epitaxially grown on the (100) oriented MgO substrate using a low pressure metalorganic chemical vapor deposition process. The waveguide region was again defined using photolithography with the propagation direction aligned to the <110> crystallographic direction of the MgO substrate. The Si$_3$N$_4$ strip-loaded layer of this embodiment was 4 μm wide and 120 nm thick, fabricated by standard plasma enhanced chemical vapor deposition and reactive ion etching processes. SiO$_2$ buffer layers of different thicknesses were deposited over the waveguide by e-beam evaporation to modify the effective microwave index. Metal electrode layers of 10 nm Cr and 800 nm Au were deposited by e-beam evaporation, followed by a standard lift-off process. The width of the electrodes is 90 μm, and the electrode gap is 15 μm. The electrodes had a 14 mm long interaction length.

Figure 10:
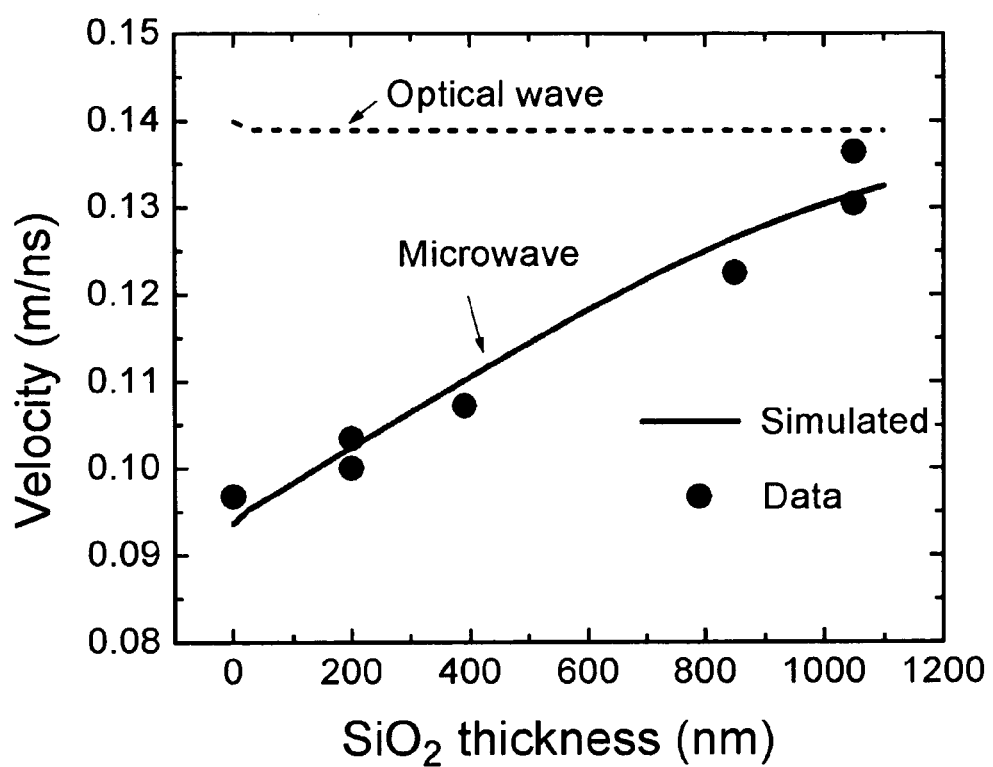
FIG. 10. Velocity verse $SiO_2$ buffer layer thickness. The solid line is a simulated microwave velocity for a 600 nm thick $BaTiO_3$ film. The dashed line is the optical velocity of the $BaTiO_3$ thin film waveguide.

The microwave velocity characteristics of the fabricated electrodes, of FIG. 9, were tested using a vector network analyzer (Agilent-8722ES) and a Cascade Microtech microwave probe station. Before measurement, the network analyzer, microwave cables, and probes were calibrated by a Cascade Microtech standard substrate. The microwave group velocity of the coplanar strip electrodes was evaluated through time-domain measurements of the transmission response of the coplanar electrode. Because the wavelength (from several millimeters to several meters) of the microwave field is much larger than the cross-section dimension of an electrode, the microwave field in the structure is considered as quasistationary and thus the microwave group velocity is approximately equal to the phase velocity at microwave frequencies (50 MHz–40.05 GHz). FIG. 10 shows the measured microwave velocity as a function of the SiO$_2$ buffer layer thickness. As the SiO$_2$ buffer layer thickness increased, the microwave velocity increased. For a SiO$_2$ buffer layer thickness of 1050 nm, a microwave velocity of 0.136 m/ns was achieved, which is within 2% of and substantially matches the optical velocity of 0.139 m/ns (the effective optical index is 2.16).

The solid line in FIG. 10 is a simulated result obtained for a 600 nm BaTiO$_3$ thin film on a MgO substrate. The simulated result is in excellent agreement with the measured data. The experimental scatter is attributed to variation of BaTiO$_3$ thickness (from 570 nm to 620 nm). The dashed line in FIG. 10 is the optical velocity of the BaTiO$_3$ thin film waveguide. From the data in FIG. 10, the effective microwave index, $N_m$, is calculated to be 3.1 for the BaTiO$_3$/MgO composites, and the corresponding calculated effective dielectric constant is 18.3. It should be noted that the value of the effective composite BaTiO$_3$/MgO dielectric constant is smaller than that of z-cut LiNbO$_3$ ($\epsilon_r = \sqrt{\epsilon_x \cdot \epsilon_z} = 35.1$), and much smaller than that of z-cut BaTiO$_3$ ($\epsilon_r = \sqrt{\epsilon_z \cdot \epsilon_x} \sim 351$). Furthermore, the 3.1 effective microwave index in thin film BaTiO$_3$ structure is much smaller than that of bulk BaTiO$_3$ ($N_m = \sqrt{0.5 + 0.5 \cdot \epsilon_r} = 13.3$), but it is still much larger than the effective optic index of 2.16 for BaTiO$_3$ thin film waveguide modulators. When a 1050 nm SiO$_2$ buffer layer was employed, the effective microwave index decreased to 2.20, which substantially matches the effective optical index.

Figure 11:
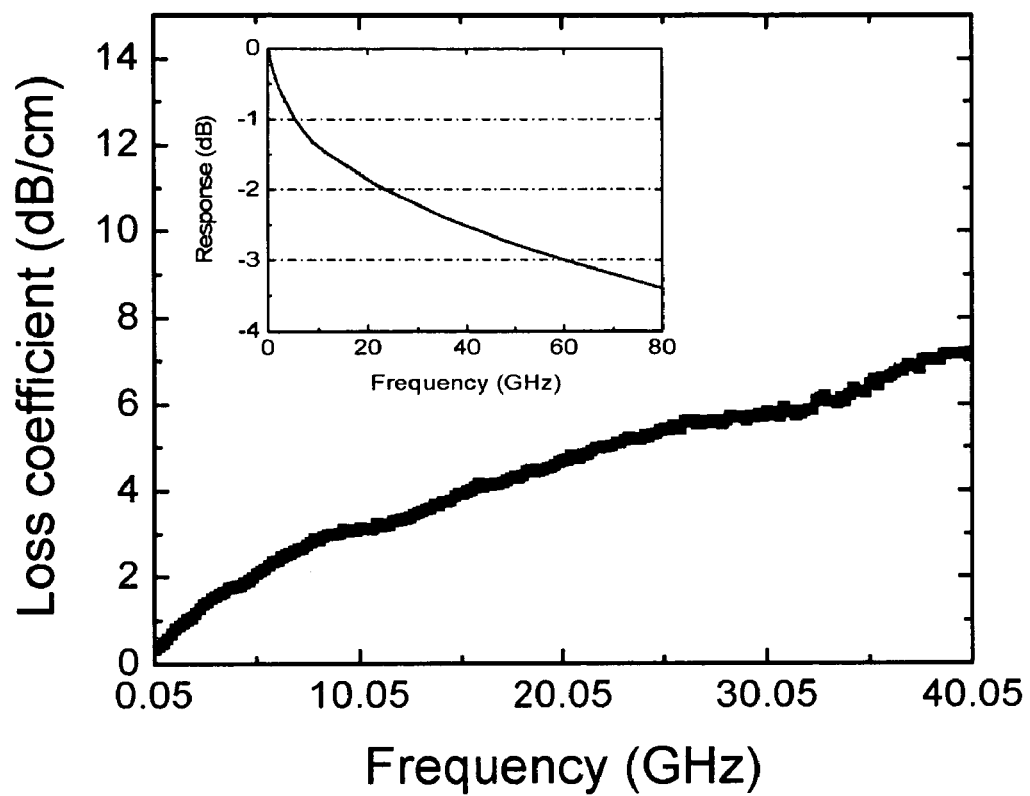
FIG. 11. Microwave loss coefficient as a function of frequency with a $SiO_2$ buffer layer thickness of 1050 nm. The inset is a simulated modulator response based on the 5-mm long quasi-velocity matched electrode.

Electrode loss and impedance affect the performance of electro-optic modulators using a device structure of this invention. From the measured S-parameters, the electrode loss coefficient and impedance are calculated. FIG. 11 shows the measured microwave loss coefficient versus frequency on CPS electrodes with 1050 nm $SiO_2$ buffer layer. The loss coefficient can be about 7.2 dB/cm at 40 GHz. The loss coefficient can be attributed to the relative thin Au electrode, and presumably can be reduced by electroplating thick Au electrode. The impedance of the electrode is about 42Ω at 40 GHz. The inset of FIG. 11 shows the result of theoretical simulation based on the quasi-velocity matched electrode with 42Ω impedance and 7.2 dB/cm microwave loss coefficient at 40 GHz. Simulation indicates that a 5 mm-long electrode would result in an optical 3-dB bandwidth greater than 40 GHz $BaTiO_3$ thin film modulator.

EXAMPLES OF THE INVENTION

The following non-limiting examples and data illustrate various aspects and features relating to the waveguide components and/or modulator devices of the present invention, including the fabrication of a film component comprising barium titanate, as is available through the methodology described herein. In comparison with the prior art, the present modulator devices and waveguide components provide results and data which are surprising, unexpected and contrary thereto. While the utility of this invention is illustrated through the use of several modulator devices and waveguide components which can be used therewith, it will be understood by those skilled in the art that comparable results are obtainable with various other devices and components, as are commensurate with the scope of this invention.

Example 1

$BaTiO_3$ thin films were deposited by low pressure MOCVD in a horizontal quartz reactor. The metal-organic precursors used were titanium tetraisopropoxide (TTIP, 99.999% purity) and a fluorinated barium precursor $(Ba(hfa)_2 \cdot PEB)$, prepared and purified as described in the literature. The oxidant was ultra-high purity oxygen. Argon was used as the carrier gas. Standard deposition conditions used source temperatures of 130° and 35° C. for $Ba(hfa)_2 \cdot PEB$ and TTIP, respectively. The oxygen flow rate of 100 sccm resulted in a partial pressure of 1.8 Torr, with a system pressure of ~4 Torr. Carrier gas flow rates were 70 and 18 sccm for the Ba and Ti precursors. The TTIP line employed a 50 sccm dilutant flow between the bubbler and the reactor. The MgO (1 0 0) substrates were boiled in electronic grade acetone and methanol and ultrasonically cleaned prior to use.

Example 2

The two-stage growth process included a low temperature nucleation stage (~750° C.) and a high temperature growth stage (~900° C.). After depositing for 5 min at 750° C., the temperature was rapidly ramped (~2°/s) to high temperature with continuous film growth throughout the ramp process. Typical growth rates were 300–400 nm/h. The thickness of the nucleation layer is estimated at ~20 nm, based on prism coupling measurements of a thick film grown under the low temperature conditions. Films from about 100 to about 1500 nm thick have been grown using this technique.

Example 3

The phase purity, epitaxy, and crystallinity of the present films were examined using a four-circle X-ray diffractometer with a graphite monochromator and 12 kW rotating anode Cu Kα source. Film thickness and refractive index were measured using a Metricon 2010 prism coupler with a 632.8 nm laser source. A Digital Nanoscope III atomic force microscope (AFM) with $Si_3N_4$ tip was used to determine the root mean square (RMS) surface roughness and surface morphology. A Hitachi S4500 scanning electron microscope with cold field emission source was used for high resolution cross-sectional imaging.

As demonstrated above, low loss, small size, low driving voltage waveguide modulator of this invention can be used as an optical building block for the next generation of ultra-broadband, high-speed fiber-optic Internet networks. Such a modulator can also be a key-enabling element for ultra-wideband optical signal processing applications, including large optical data handling in links of satellite-to-satellite, satellite-to-aircraft and phase array radar systems. Small size, thin film waveguide electro-optic devices can greatly decrease optical devices packaging cost, simplify optical component design, and accelerate the development of integrated photonic circuits. Such low loss modulators can leverage the potential implementation of these photonic systems.

We claim:

1. A strip-loaded thin film electro-optic waveguide modulator device comprising a waveguide, said waveguide comprising: a substrate; a nano-dimensioned film component on said substrate, said film component comprising $BaTiO_3$; and a ridge component on said film component, said ridge component having a refractive index less than the refractive index of said film component.

2. The device of claim 1 wherein said waveguide is dimensioned to reduce polarization-dependent loss.

3. The device of claim 2 where said ridge component comprises $Si_3N_4$ and has a thickness dimension ranging from about 100 nm to about 200 nm, and said film component has a thickness dimension ranging from about 300 nm to about 700 nm.

4. The device of claim 1 comprising two opposed, substantially coplanar electrodes, each said electrode on an opposed side of said ridge component.

5. The device of claim 4 incorporated into a fiber-optic internet network.

6. The device of claim 1 comprising a $SiO_2$ buffer component over said ridge component and between said film component and said electrodes.

7. The device of claim 6 wherein said buffer component has a thickness dimension greater than about 400 nm.

8. The device of claim 7 wherein said buffer component dimension is selected to substantially match optic wave and microwave phase velocities through said waveguide.

9. A strip-loaded thin film, electro-optic waveguide modulator device, comprising a substrate; a nano-dimensioned film component on said substrate, said film component comprising $BaTiO_3$; a ridge component on said film component, said ridge component having a refractive index less than the refractive index of said film component; two substantially coplanar electrodes, each said electrode on an opposed side of said ridge component; and a $SiO_2$ buffer component over said ridge component and between said film component and said electrodes.

10. The device of claim 9 dimensioned to reduce planarization-dependant loss, said ridge component having a thickness dimension ranging from about 100 nm to about 200 nm, and said film component having a thickness dimension ranging from about 300 nm to about 700 nm.

11. The device of claim 10 wherein said buffer component has a thickness dimension greater than about 400 nm.

12. The device of claim 11 wherein said buffer component dimension is selected to substantially match optic wave and microwave phase velocities.

13. A method of using a $SiO_2$ component to reduce the effective microwave refractive index of a $BaTiO_3$ thin film composite waveguide modulator device, said method comprising:

provides a modulator device comprising a nano-dimensioned film component comprising $BaTiO_3$, and a ridge component on said film component, said waveguide providing a first microwave refractive index at a given wavelength; and providing a $SiO_2$ buffer component over said ridge component and said film component, said waveguide providing a second, lower effective microwave refractive index at said wavelength.

14. The method of claim 13 wherein said waveguide is dimensioned to reduce polarization-dependant loss, said ridge component having a thickness dimension ranging from about 100 nm to about 200 nm, and said film component having a thickness dimension ranging from about 300 nm to about 700 nm.

15. The method of claim 14 wherein said buffer component has a thickness dimension greater than about 400 nm.

16. A method of using a buffer component dimension to increase microwave phase velocity in a waveguide modulator, said method comprising;

providing a strip-loaded thin film electro-optic modulator device comprising a waveguide comprising a nano-dimensioned film component comprising $BaTiO_3$, and a ridge component on said film component, said waveguide providing a first microwave phase velocity at a given wavelength; and providing a $SiO_2$ buffer component on said ridge and film components, said buffer component thickness dimension selected to provide a second, higher microwave phase velocity at said wavelength.

17. The method of claim 16 wherein said thickness dimension is selected to provide a microwave phase velocity substantially matching the optic wave phase velocity, at said wavelength.

18. The method of claim 16 wherein said waveguide is dimensioned to reduce polarization-dependent loss, said ridge component having a thickness dimension ranging from about 100 nm to about 200 nm, and a film component having a thickness dimension ranging from about 300 nm to about 700 nm.

19. The method of claim 18 wherein said buffer component has a thickness dimension greater than about 400 nm.

20. The method of claim 19 wherein said film component has a thickness dimension of about 600 nm and said buffer component has a thickness dimension of about 1050 nm.

* * * * *

UNITED STATES PATENT AND TRADEMARK OFFICE
CERTIFICATE OF CORRECTION

PATENT NO. : 7,224,878 B1 Page 1 of 1
APPLICATION NO. : 11/273152
DATED : May 29, 2007
INVENTOR(S) : Bruce W. Wessels et al.

It is certified that error appears in the above-identified patent and that said Letters Patent is hereby corrected as shown below:

Title Page, Item (75): Bruce W. Wessels, Evanston, IL (US) should be
--Bruce W. Wessels, Wilmette, IL (US)--

Title Page, Item (74): Reihart, Boerner, Van Deuren, s.c. should be
--Reinhart, Boerner, Van Deuren s.c.--

Signed and Sealed this

Fifteenth Day of April, 2008

JON W. DUDAS
*Director of the United States Patent and Trademark Office*